US011539319B2

(12) United States Patent
Chretien et al.

(10) Patent No.: US 11,539,319 B2
(45) Date of Patent: Dec. 27, 2022

(54) CONTROLLER AND DRIVE CIRCUIT FOR ELECTRIC MOTORS

(71) Applicant: Regal Beloit America, Inc., Beloit, WI (US)

(72) Inventors: Ludovic Andre Chretien, Columbia City, IN (US); Lester Benjamin Manz, Paulding, OH (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 17/156,003

(22) Filed: Jan. 22, 2021

(65) Prior Publication Data
US 2022/0239246 A1   Jul. 28, 2022

(51) Int. Cl.
*H02P 27/04* (2016.01)
*F25B 31/02* (2006.01)
*H02P 27/06* (2006.01)
*H02P 25/04* (2006.01)

(52) U.S. Cl.
CPC .......... *H02P 27/045* (2013.01); *F25B 31/026* (2013.01); *H02P 25/04* (2013.01); *H02P 27/06* (2013.01)

(58) Field of Classification Search
CPC .......... H02P 27/08; H02P 6/08; H02P 25/024; H02P 1/44; H02H 7/00; G05B 5/00; F04D 13/06
See application file for complete search history.

(56) References Cited

U.S. PATENT DOCUMENTS

| | | | |
|---|---|---|---|
| 3,422,633 A * | 1/1969 | Bodett | H02P 1/44 62/158 |
| 5,068,590 A | 11/1991 | Glennon et al. | |
| 6,051,952 A | 4/2000 | Moreira et al. | |
| 6,282,910 B1 | 9/2001 | Helt | |
| 6,801,013 B2 | 10/2004 | Woodward et al. | |
| 6,952,088 B2 | 10/2005 | Woodward et al. | |
| 7,952,316 B2 | 5/2011 | Ev et al. | |

(Continued)

FOREIGN PATENT DOCUMENTS

| | | |
|---|---|---|
| CN | 111472968 A | 7/2020 |
| EP | 1268323 B1 | 9/2015 |

(Continued)

*Primary Examiner* — Said Bouziane
(74) *Attorney, Agent, or Firm* — Armstrong Teasdale LLP

(57) ABSTRACT

An electric motor system is described. The electric motor system includes a drive circuit including an inverter configured to supply variable frequency current and a contactor configured to supply line frequency current. The electric motor system also includes an electric motor coupled to the drive circuit wherein the electric motor is communicatively coupled to a controller. The controller is configured to control the inverter to supply variable frequency current to the electric motor, thereby operating the electric motor at a motor speed, and determine, based upon at least one input parameter, a maximum potential motor speed the inverter can achieve. The controller is also configured to receive a command to operate the electric motor at line frequency current and control the drive circuit to transition from supplying variably frequency current to supplying line frequency current before the maximum potential motor speed the inverter can achieve is reached.

23 Claims, 3 Drawing Sheets

(56) References Cited

U.S. PATENT DOCUMENTS

| | | | |
|---|---|---|---|
| 8,766,489 | B2 | 7/2014 | Lathrop |
| 8,853,992 | B2 | 10/2014 | Boom |
| 9,800,188 | B2 | 10/2017 | Chretien et al. |
| 10,439,540 | B1 | 10/2019 | Chretien et al. |
| 10,819,254 | B2 | 10/2020 | Chretien et al. |
| 10,840,830 | B2 | 11/2020 | Chretien et al. |
| 2003/0000801 | A1 | 1/2003 | Spannhake et al. |
| 2003/0043606 | A1 | 3/2003 | Lipo et al. |
| 2008/0290824 | A1* | 11/2008 | Choi ................ H02J 3/007 318/139 |
| 2014/0356686 | A1 | 12/2014 | Namou et al. |
| 2017/0077857 | A1 | 3/2017 | Chretien et al. |
| 2018/0269810 | A1* | 9/2018 | Chretien ............ H02P 1/445 |
| 2020/0044583 | A1* | 2/2020 | Chretien ............ H02P 25/26 |

FOREIGN PATENT DOCUMENTS

| | | | |
|---|---|---|---|
| JP | 03993793 B2 | 10/2007 | |
| WO | WO-2018187346 A1 * | 10/2018 | ......... F04D 15/0066 |

* cited by examiner

CONTROLLER AND DRIVE CIRCUIT FOR ELECTRIC MOTORS

BACKGROUND

The field of the disclosure relates generally to a controller and drive circuit for an electric motor, specifically a permanent split capacitor (PSC) motor and, more specifically, a motor controller controlling a drive circuit by dynamically determining when the drive circuit should transfer to supplying line frequency power.

At least some known PSC motors are fixed speed motors that operate most efficiently at line frequency power. Such PSC motors exhibit uncontrolled acceleration during startup. Further, at low load conditions, such PSC motors operate less efficiently. Alternatively, a PSC motor may be driven with a variable speed motor controller to adapt motor speed to a load level. Such configurations are generally limited by power factor, electromagnetic interference, and electrical losses.

A drive circuit for PSC motors enables efficient operation at both high and low load conditions. For example, a PSC motor operating a compressor in a heating, ventilation and air conditioning (HVAC) system may experience high load conditions during peak temperatures and low load conditions during milder temperatures. The drive circuit operates the PSC motor using an inverter under low load conditions, and operates the PSC motor using line frequency power under high load conditions.

When starting a compressor, the load on the PSC motor is generally low and builds over time as suction and discharge pressures increase the torque demand on the PSC motor. The starting torque output of the PSC motor, at line frequency power, for example, is generally higher than the torque load at startup when the pressures are near equalized. Conversely, when a compressor has been operating for some time, suction and discharge pressures may build up and produce a torque load that exceeds the starting torque output, thus preventing the PSC motor from turning, i.e., a locked rotor or a stalled compressor. At least some system controllers for PSC motors include an interlock that prevents restarts of the PSC motor until pressures have nearly equalized in the compressor, thereby relieving the starting torque load. Such interlocks may be on the order of minutes in duration, during which the compressor cannot operate. Accordingly, systems and methods for controlling a drive circuit for a PSC motor are desired wherein no downtime/interlock is required when transitioning to/from line frequency power and wherein the PSC motor operates seamlessly during the transition (e.g., problems such as a locked rotor or stalled compressor are avoided).

BRIEF DESCRIPTION

In one aspect, an electric motor system is described. The electric motor system includes a drive circuit including an inverter configured to supply variable frequency current over a first duration and a contactor or electronic switches configured to supply line frequency current over a second duration. The electric motor system also includes an electric motor coupled to the drive circuit wherein the electric motor is communicatively coupled to a controller. The controller is configured to control the inverter to supply variable frequency current to the electric motor over the first duration, thereby operating the electric motor at a motor speed, and determine, based upon at least one received input parameter or measured input parameter, a maximum potential motor speed the inverter can achieve. The controller is also configured to receive a command to operate the electric motor at line frequency current and control the drive circuit to transition from supplying variably frequency current to supplying line frequency current before the maximum potential motor speed the inverter can achieve is reached.

In another aspect, an electric motor is described. The electric motor includes a drive circuit including an inverter configured to supply variable frequency current over a first duration and a contactor or electronic switches configured to supply line frequency current over a second duration. The electric motor also includes a controller communicatively coupled to the drive circuit and the electric motor. The controller is configured to control the inverter to supply variable frequency current to the electric motor over the first duration, thereby operating the electric motor at a motor speed and determine, based upon at least one received input parameter or measured input parameter, a maximum potential motor speed the inverter can achieve. The controller is also configured to determine to operate the electric motor at line frequency current and control the drive circuit to transition from supplying variably frequency current to supplying line frequency current before the maximum potential motor speed the inverter can achieve is reached.

In yet another aspect, a method of operating an electric motor is described. The electric motor is communicatively coupled to a controller and coupled to a drive circuit including an inverter configured to supply variable frequency current over a first duration and a contactor or electronic switches configured to supply line frequency current over a second duration. The method includes controlling the inverter to supply variable frequency current to the electric motor over the first duration, thereby operating the electric motor at a motor speed and determining, based upon at least one received input parameter or measured input parameter, a maximum potential motor speed the inverter can achieve. The method also includes receiving a command to operate the electric motor at line frequency current and controlling the drive circuit to transition from supplying variably frequency current to supplying line frequency current before the maximum potential motor speed the inverter can achieve is reached.

DETAILED DESCRIPTION

Figure 1:
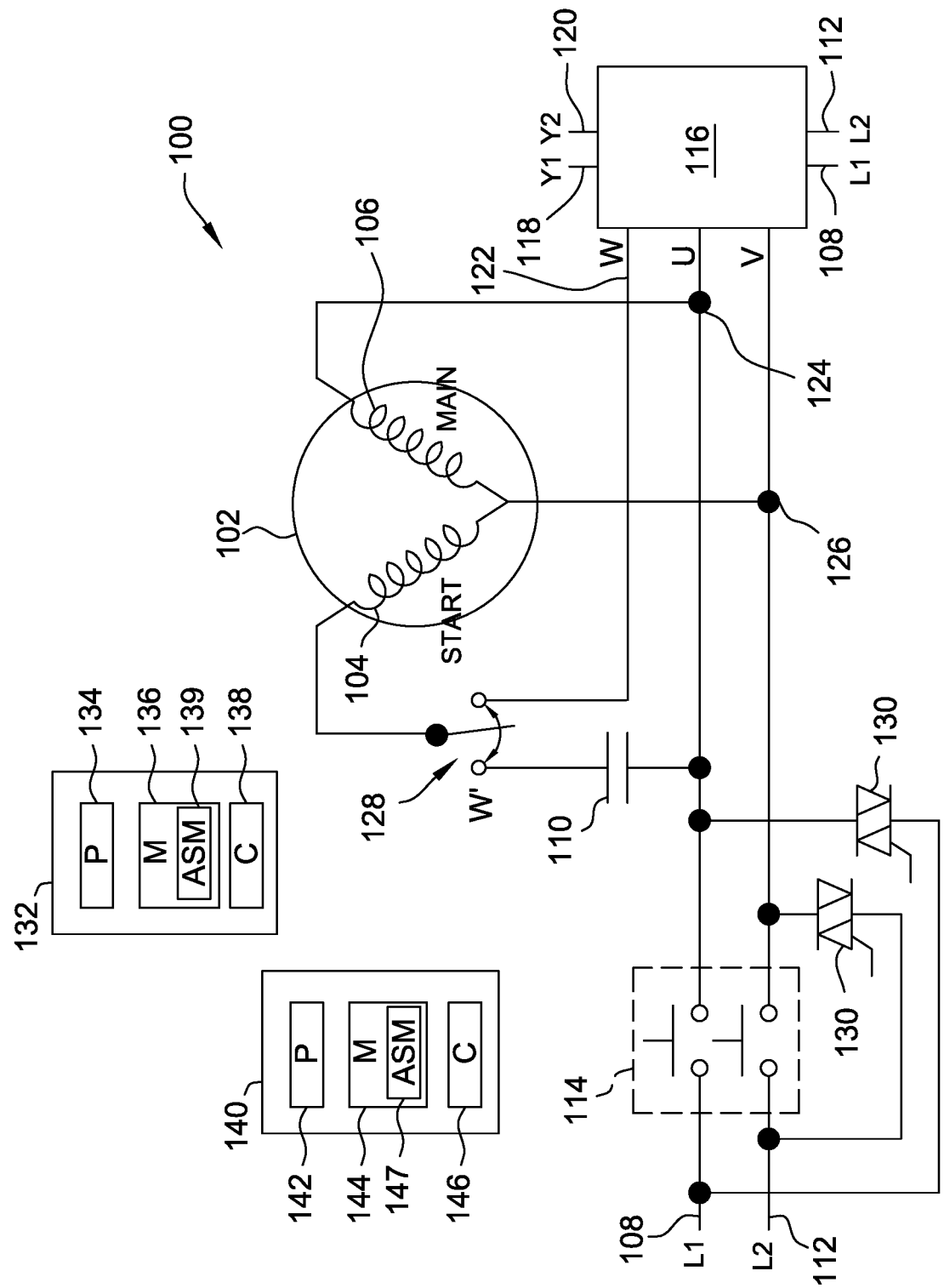
FIG. 1 is a schematic diagram of an exemplary drive circuit for a PSC motor.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

In operating a compressor, a drive circuit for an electric motor, such as a PSC motor, drives the electric motor with an inverter under low load conditions and with line frequency power under high load conditions. Generally, the inverter and line frequency power cannot both be connected to the electric motor at the same time, because of the potential for a line-to-line short circuit. To transition from inverter to line, or line to inverter, one is disconnected before connecting the other.

When transitioning from the inverter to line frequency power, the starting torque output at line frequency power may fall below the torque demand from the compressor. Under such conditions, the compressor can stall, i.e., winding current increases, and motor speed and motor torque decay within a single line cycle, or approximately 16 ms. It is further realized herein the typical interlock duration for restarting an electric motor operating a compressor is too long for the electric motor to transition between operation with the inverter to operation at line-frequency power for effective system operation.

Accordingly, the drive circuit described herein is in communication with at least one controller (e.g., a motor controller, a system controller, etc.) that is configured to dynamically determine when the drive circuit should transition from supplying variable frequency current to supplying line frequency current such that the PSC motor is in constant operation (e.g., no restart is required). As explained above, when a compressor has been operating for some time, suction and discharge pressures may build up that produce a torque load that exceeds the starting torque output under AC main operation, thus preventing the PSC motor from turning, i.e., a locked rotor or a stalled compressor. Accordingly, a controller in communication with the drive circuit is configured to determine a maximum operating speed of the inverter (e.g., by measuring speed and current during operation at low speed) and, based on the determined maximum operating speed of the inverter, control the drive circuit to transition to supplying line frequency current before the maximum operating speed of the inverter is reached (e.g., before suction/discharge pressures and temperatures build enough such that maximum inverter capabilities would need to be surpassed to maintain smooth operation of the PSC motor).

In an example embodiment, when the motor controller is controlling the drive circuit to supply variable frequency current to the electric motor, the motor controller is configured to estimate a maximum speed the inverter can achieve (e.g., based on measurements such as low speed current, low speed, pressure buildup, and temperature). The motor controller is configured to determine the maximum speed based on at least one input parameter (e.g., such as the examples above, as received from another device, or measured locally at the PSC motor or compressor) and at least one of a lookup table and polynomial stored in a memory of the motor controller. The motor controller then transmits a message to a system controller, the message including the determined potential maximum operating speed of the inverter. Upon receipt of the message from the motor controller, the system controller determines if the drive circuit should transition to supplying line frequency current (e.g., depending on whether the maximum operating speed of the inverter is approaching, or is within a predefined range from, the received potential maximum operating speed of the inverter). When the system controller determines the drive circuit should transition to supplying line frequency power (e.g., before excessive build of pressure or temperature), the system controller transmits a message to the motor controller and, in response to receiving the message, the motor controller controls the drive circuit to reach the optimal transition point to enable the supply of line frequency power to the compressor.

In another example embodiment, the motor controller is configured to store at least one determined potential maximum operating speed of the inverter in a memory of the motor controller (e.g., as a lookup table or polynomial based on system operating parameters). Then, upon receiving a message/command from the system controller to control the drive circuit to transition to supply line frequency current, the motor controller is configured to determine if the operating speed of the inverter needs to be reduced based on the potential maximum operating speed of the inverter (e.g., the transition to line frequency current may need to occur with the inverter operating at a relatively lower speed in some instances based on temperature and pressure, as examples). The motor controller then determines an operating speed of the inverter at which the transition to line frequency can be made, and controls the inverter to operate the motor at that speed before controlling the drive circuit to transition to supplying line frequency current.

FIG. 1 is a schematic diagram of an exemplary drive circuit 100 for a PSC motor 102. PSC motor 102 includes a start winding 104 and a main winding 106. During normal line frequency operation, line frequency current, such as 50 Hertz or 60 Hertz, for example, is supplied on a first line, or L1, 108 to start winding 104 through a capacitor 110, and to main winding 106. A second line, or L2, 112 provides a return, or neutral, for the line frequency current. Drive circuit 100 includes a contactor 114 for connecting and disconnecting L1 and L2 to PSC motor 102. Contactor 114 is a two pole mechanical contactor that is commutated by energizing a coil (not shown). In certain embodiments, capacitor 110 may be coupled to L1 on either side of contactor 114.

Drive circuit 100 includes an inverter 116 that is enabled to drive PSC motor 102 with variable frequency power under low load, or at least less than full load, conditions. In some embodiments, inverter 116 is supplied line frequency power on L1 and L2, and is controlled over control lines 118 and 120, or Y1 and Y2. In some embodiments, inverter 116 may be controlled by any other suitable means, including, for example, digital control signals (e.g., serial communication or Modbus communication) and analog control signals (e.g., transmitted from motor controller 132 or system controller 140). Inverter 116 enables variable speed operation of PSC motor 102 by regulating phase and frequency of alternating current (AC) voltages on output terminals W, U, and V. Terminal W is coupled to a node 122, terminal U is coupled to a node 124, and terminal V is coupled to a node 126. Drive circuit 100 includes a bypass switch 128 that enables bypass of capacitor 110 during operation through inverter 116. When driven by inverter 116, start winding 104 of PSC motor 102 is coupled across nodes 122 and 126, i.e., terminals W and V of inverter 116, and main winding 106 is coupled across nodes 124 and 126, i.e., terminals U and V of inverter 116.

When operating PSC motor 102 using inverter 116, contactor 114 is open and inverter 116 is enabled via control lines 118 and 120, or other suitable control means. To transition to line frequency power, inverter 116 is disabled and contactor 114 is closed to couple L1 and L2 directly to PSC motor 102. Contactor 114 may require one to two line cycles to close. Drive circuit 100 includes solid state switches 130 coupled in parallel with the two poles of contactor 114 on L1 and L2. During the transition from inverter 116 to line frequency power, and after inverter 116 is disabled, solid state switches 130 are closed to couple L1 and L2 directly to PSC motor 102 in as few as 1 ms, thereby avoiding a power interruption that may result in a potential locked rotor due to loading on and stalling of PSC motor 102. Solid state switches 130 remain closed and conduct line frequency current until contactor 114 is closed. Once contactor 114 is closed, solid state switches 130 are opened to redirect the line frequency current through contactor 114. In some embodiments, contactor 114 and solid state switches 130 are connected to L1 and L2 through an input impedance (not shown) of inverter 116 (e.g., after EMI filter and inrush current limiter).

Motor controller 132 is communicatively coupled to motor 102 to operate motor 102 (e.g., in adaptive starting mode 139). Further, motor controller 132 may be coupled to one or more additional components of drive circuit 100, including inverter 116, contactor 114, solid state switches 130, and control lines 118 and 120 (Y1 and Y2). More specifically, motor controller 132 transmits control signals to operate motor 102. In the example embodiment, by adjusting the control signals, motor controller 132 is configured to control inverter 116 to supply variable frequency current to motor 102 as described above. Further, motor controller 132 is configured to adjust the control signals to control the transition from inverter 116 supplying variable frequency power, to supplying line frequency power as described above (e.g., from L1 and L2). For example, in some embodiments, motor controller 132 and inverter 116 are embodied in the same drive (e.g., such that motor controller 132 receives signals from control lines 118 and 120, and then commands inverter 116 based upon the received signals). In some embodiments, motor controller 132 may be communicatively coupled to another controller (e.g., system controller 140) associated with motor 102. In such embodiments, motor controller 132 may be configured to allow system controller 140 to operate motor 102. In the exemplary embodiment, motor controller 132 is separate from motor 102. In one example, motor controller 132 may be integrated with motor 102. In another example, motor controller 132 is an external controller, such as a thermostat system. In some embodiments, motor controller 132 and system controller 140 may be integrated in the same controller (e.g., any description of motor controller 132 may be integrated in system controller 140, or any other controller, and vice versa).

In an example embodiment, motor controller 132 includes processor 134, memory 136 communicatively coupled to processor 134, and communications interface 138. Motor controller 132 is also communicatively coupled system controller 140. Processor 134 is configured to execute instructions stored within memory 136 to cause motor controller 132 to function as described herein (e.g., in adaptive starting mode 139). Moreover, memory 136 is configured to store data to facilitate controlling motor 102. In some embodiments, motor controller 132 may include a plurality of processors 134 and/or memories 136. In other embodiments, memory 136 may be integrated with processor 134. In one example, memory 136 includes a plurality of data storage devices to store instructions and data as described herein. Communications interface 138 may include one or more wired or wireless hardware interface such as, for example, universal serial bus (USB), RS232, RS485, or other serial bus, CAN bus, Ethernet, near field communication (NFC), WiFi, Bluetooth, or any other suitable digital or analog interface for establishing one or more communication channels. The established communication channels may include, for example, channels between motor controller 132 and system controller 140. Communications interface 138 further includes a software or firmware interface for receiving one or more motor control parameters and writing them, for example, to memory 136. In some embodiments, communication interface 138 includes, for example, a software application programming interface (API) or command set for supplying, as examples, one or more coefficient values for a polynomial configured to facilitate determining a maximum operating speed of inverter 116, and a lookup table also configured to facilitate determining a maximum operating speed of inverter 116. In such embodiments, values (e.g., coefficients for the polynomial and values for the lookup table) are stored in memory 136 along with at least one polynomial for subsequent execution by processor 134 during operation of motor 102. In some embodiments, polynomials and lookup tables are preloaded in the motor controller.

In the exemplary embodiment, system controller 140 includes processor 142, memory 144 communicatively coupled to processor 142, and communications interface 146. System controller 140 is also communicatively coupled to motor controller 132. Processor 142 is configured to execute instructions stored within memory 144 to cause system controller 140 to function as described herein (e.g., in adaptive starting mode 147). In some embodiments, system controller 140 may include a plurality of processors 142 and/or memories 144. In other embodiments, memory 144 may be integrated with processor 142. In one example, memory 144 includes a plurality of data storage devices to store instructions and data as described herein. Communications interface 146 may include one or more wired or wireless hardware interface such as, for example, universal serial bus (USB), RS232 or other serial bus, CAN bus, Ethernet, near field communication (NFC), WiFi, Bluetooth, or any other suitable digital or analog interface for establishing one or more communication channels. The established communication channels may include, for example, channels between system controller 140 and motor controller 132. Communications interface 146 further includes a software or firmware interface for receiving one or more motor control parameters and writing them, for example, to memory 144. As explained above, in some embodiments, system controller 140 may be configured to perform any of the functions described herein with respect to motor controller 132 or any other controller.

Figure 2:
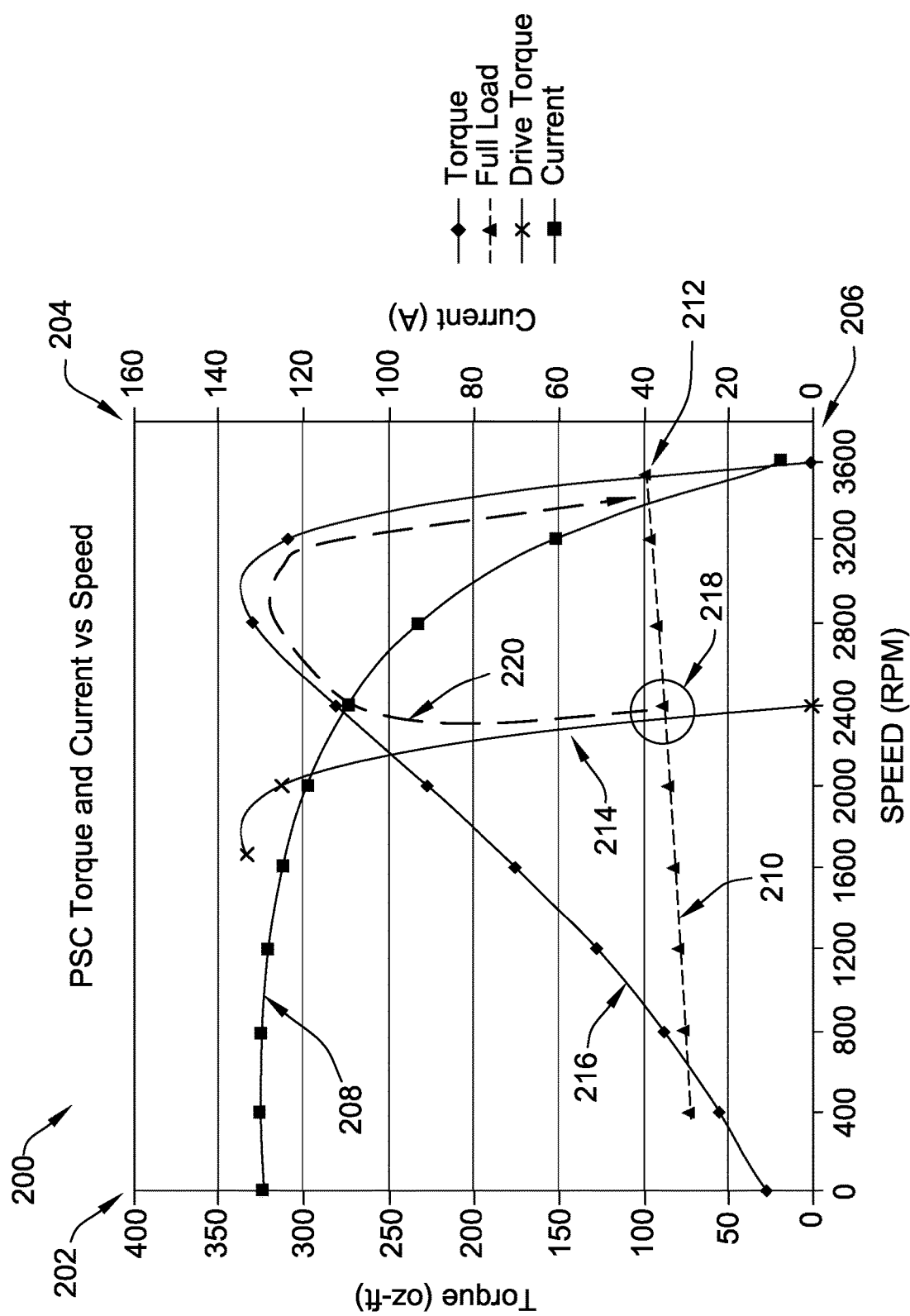
FIG. 2 is a graph of exemplary torque, speed, and current curves for a PSC motor.

FIG. 2 is a graph 200 of torque, speed, and current for a PSC motor, such as PSC motor 102, shown in FIG. 1. Graph 200 includes a left vertical axis 202 representing torque in ounce-feet (oz-ft), ranging from zero ounce-feet to 400 ounce-feet. Graph 200 includes a right vertical axis 204 representing current supplied to the PSC motor in Amperes (A), ranging from zero Amperes to 160 Amperes. Graph 200 includes a horizontal axis 206 representing speed of the PSC motor in rotations per minute (RPM), ranging from zero RPM to above 3600 RPM.

Graph 200 includes a current curve 208 that represents the current demanded by the PSC motor versus the motor speed. Current curve 208 is relatively high and flat as the motor starts and builds speed. Demanded current falls as motor speed increases, falling gradually at lower speeds and falling with an increasing negative slope as motor speed increases.

Graph 200 includes a torque load curve 210 representing the peak torque of the PSC motor versus motor speed that the PSC motor must deliver when operating the system. Torque load curve 210 is the load the PSC motor is required to provide to operate the system. Torque load curve 210 further defines a steady state load torque value 212, represented as a triangle on torque load curve 210.

Graph 200 includes a torque curve 214 that represents the torque output of the PSC motor while being driven by an inverter in a drive circuit, such as, for example, drive circuit 100 and inverter 116, shown in FIG. 1. Torque curve 214 illustrates operation of the PSC motor at speeds no greater than 2400 RPM, and producing high levels of torque output.

Graph 200 includes a torque curve 216 that represents the torque output of the PSC motor while being driven at line frequency power. Torque curve 216, notably, operates with little torque output when starting from zero RPM. Torque curve 216 and torque load curve 210 illustrate, at low speeds, the torque output of the PSC motor is below torque load curve 210. As motor speed increases, torque curve 216 is relatively linear until its peak around 3000 RPM, above which torque output declines rapidly.

Graph 200 further includes an intersection 218 of torque curve 214 and torque load curve 210. Intersection 218 represents the point at which drive circuit 100 controls the transition from PSC motor 102 being driven by inverter 116 to being driven by line frequency power. As described further herein, intersection 218 will vary on graph 200 based on different determinations made by at least one of motor controller 132 and system controller 140. Upon supply of line frequency current by drive circuit 100, PSC motor 102 accelerates along a transition torque curve 220 until peak torque 212 is reached on torque load curve 210.

Figure 3:
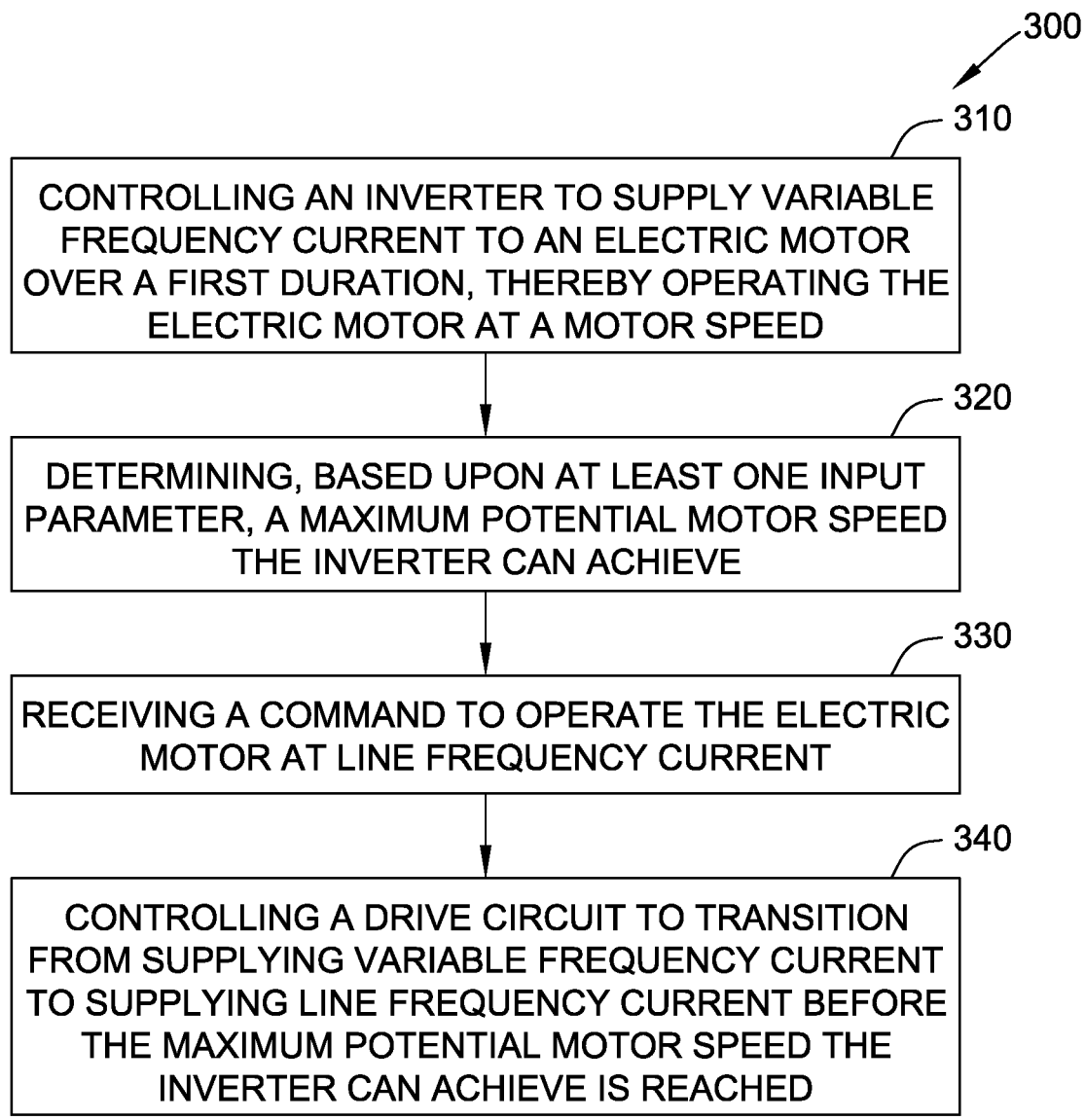
FIG. 3 is a flow diagram of an exemplary method of operating a PSC motor.

FIG. 3 is a flow diagram of an exemplary method 300 of operating an electric motor (e.g., PSC motor 102). Method 300 includes controlling 310 an inverter (e.g., inverter 116) to supply variable frequency current to the electric motor over a first duration, thereby operating the electric motor at a motor speed. Method 300 also includes determining 320, based upon at least one input parameter (e.g., a received input parameter or measured input parameter, such as low speed current, low speed, pressure buildup, and temperature, as described above), a maximum potential motor speed the inverter can achieve and receiving 330 a command to operate the electric motor at line frequency current. Method 300 further includes controlling 340 a drive circuit (e.g., drive circuit 100) to transition from supplying variable frequency current to supplying line frequency current before the maximum potential motor speed the inverter can achieve is reached.

In some embodiments, method 300 includes determining, based upon at least one received or measured input parameter and at least one of a lookup table or a polynomial, a maximum potential motor speed the inverter can achieve, wherein the at least one received or measured input parameter includes at least one of a temperature, a pressure, a current, a voltage, or a load. In some embodiments, method 300 includes storing, at a system controller in communication with the controller, the maximum potential motor speed the inverter can achieve, determining, in response to receiving the maximum potential motor speed, the inverter is operating the electric motor at below the maximum potential motor speed, and transmitting a signal to the controller indicating the drive circuit should be controlled to transition from supplying variable frequency to supplying line frequency. In some embodiments, method 300 includes storing, at a system controller in communication with the controller, the maximum potential motor speed the inverter can achieve, receiving, from the system controller, a command to transition the drive circuit from supplying variable frequency to supplying line frequency, determining the motor speed should be reduced before transitioning the drive circuit from supplying variable frequency to supplying line frequency, determining a reduced motor speed, controlling the inverter to operate the electric motor at the reduced motor speed, and controlling the drive circuit to transition from supplying variably frequency current to supplying line frequency current. In some embodiments, method 300 includes determining an estimated pressure and an estimated load drop at at least one potential reduced motor speed and determining the reduced motor speed, from the at least one potential reduced motor speed, based at least in part upon the estimated pressure and estimated load drop.

Referring to FIGS. 1-3, in an example embodiment, when motor controller 132 is controlling 310 drive circuit 100 to supply variable frequency current to an electric motor (e.g., PSC motor 102), motor controller 132 is configured to estimate a maximum speed inverter 116 can achieve (e.g., based on measurements such as low speed current, low speed, pressure buildup, temperature, and load). Motor controller 132 is configured to determine 320 the maximum speed based on at least one input parameter (such as the examples above) and at least one of a lookup table and polynomial stored in memory 136. Motor controller 132 then transmits a message to system controller 140, the message including the determined potential maximum operating speed of inverter 116. Upon receipt of the message from motor controller 132, system controller 140 determines if drive circuit 100 should transition to supplying line frequency current (e.g., depending on whether the maximum operating speed of inverter 116 is approaching, or is within a predefined range from, the received/stored potential maximum operating speed of inverter 116). When system controller 140 determines drive circuit 100 should transition to supplying line frequency power (e.g., before excessive build of pressure or temperature), system controller 140 transmits a message to motor controller 132 and, in response to receiving 330 the message, motor controller 132 controls 340 drive circuit 100 to transition to supply line frequency current as described herein.

In another example embodiment, motor controller 132 is configured to store the determined potential maximum operating speed of inverter 116 in memory 136. Then, upon receiving 330 a message/command from system controller 140 to control drive circuit 100 to transition to supply line frequency current, motor controller 132 is configured to determine if the operating speed of inverter 116 needs to be reduced based on the determined/stored potential maximum operating speed of inverter 116 (e.g., the transition to line frequency current may need to occur with inverter 116 operating PSC motor 102 at a relatively lower speed in some instances based on temperature and pressure, as examples). Motor controller 132 then determines an maximum operating speed of inverter 116 at which the transition to line frequency can be made, and controls inverter 116 to operate the electric motor at that speed before controlling 340 the drive circuit 100 to transition to supplying line frequency current.

In some embodiments, the systems and methods described herein may be used in an adaptive starting mode (e.g., 139, 147) wherein start of a compressor is delayed or staggered to allow starting of a house generator (e.g., to avoid nearly instantaneous peak load on the generator that may cause the generator to trip). Further, the adaptive starting mode may eliminate the need for a low voltage starter to be installed with house generators (e.g., because the adaptive starting mode produces much less torque and current, and therefore much less load on the PSC motor than with a traditional PSC motor start). Additionally, the systems and methods described herein may enable use of a generator mode where, for example, an HVAC system only runs at low power and cooling capacity (e.g., by only operating the motor below the maximum potential motor speed the inverter can achieve, as described herein). Additionally, the systems and methods described for adaptive starting may be further configured to set, or modify, the transition speed point to minimize peak current or power draw when transitioning to line frequency.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

The systems and methods described herein are not limited to the specific embodiments described herein, but rather, components of the systems and/or steps of the methods may be utilized independently and separately from other components and/or steps described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric motor system comprising:
  a drive circuit including an inverter configured to supply variable frequency current over a first duration and a contactor configured to supply line frequency current over a second duration; and
  an electric motor coupled to the drive circuit, wherein the electric motor is communicatively coupled to a controller configured to:
    control the inverter to supply variable frequency current to the electric motor over the first duration, thereby operating the electric motor at a variable motor speed;
    dynamically determine, based upon at least one input parameter indicating build up of at least one of pressure or temperature while the electric motor has operated at the variable motor speed, a maximum potential motor speed the inverter can achieve;
    receive a command to operate the electric motor at line frequency current, wherein the electric motor operates at a motor speed corresponding to line frequency when line frequency current is supplied, and wherein the motor speed corresponding to line frequency is greater than the variable motor speed and the maximum potential motor speed is between the variable motor speed and the motor speed corresponding to line frequency; and
    as speed of the motor transitions between the variable motor speed and the motor speed corresponding to line frequency, control the drive circuit to transition from supplying variable frequency current to supplying line frequency current before the maximum potential motor speed the inverter can achieve is reached.

2. The electric motor system of claim 1, wherein the controller is further configured to determine, based upon at least one input parameter and at least one of a lookup table or a polynomial, the maximum potential motor speed the inverter can achieve, wherein the at least one input parameter includes at least one of a temperature, a pressure, a current, a voltage, or a load.

3. The electric motor system of claim 1, wherein the controller is further configured to transmit, to a system controller in communication with the controller, a signal indicating the maximum potential motor speed the inverter can achieve.

4. The electric motor system of claim 3, wherein the system controller is configured, in response to receiving the signal indicating the maximum potential motor speed, to:
  determine the inverter is operating the electric motor at a speed below the maximum potential motor speed; and
  transmit a signal to the controller indicating the drive circuit should be controlled to transition from supplying variable frequency to supplying line frequency.

5. The electric motor system of claim 3, wherein the controller is configured to:
  receive, from the system controller, a command to transition the drive circuit from supplying variable frequency to supplying line frequency;
  determine the variable motor speed is above a speed at which a transition to line frequency can be made;
  determine a reduced value of the variable motor speed;
  control the inverter to operate the electric motor at the reduced value of the variable motor speed before transitioning the drive circuit from supplying variable frequency current to supplying line frequency current; and control the drive circuit to transition from supplying variably frequency current to supplying line frequency current.

6. The electric motor system of claim 5, wherein the controller is further configured to:
determine an estimated pressure and an estimated load drop at at least one potential variable motor speed; and
determine the reduced value of the variable motor speed, from the at least one potential variable motor speed, based at least in part upon the estimated pressure and estimated load drop.

7. The electric motor system of claim 3, wherein the system controller comprises the controller.

8. The electric motor system of claim 1, wherein the controller is further configured to operate in an adaptive starting mode defined by delaying operation of a compressor.

9. The electric motor system of claim 1, wherein the controller is further configured to determine to control the drive circuit to transition from supplying variably frequency to supplying line frequency to minimize peak current or power draw when transitioning to supplying line frequency.

10. The electric motor system of claim 1, wherein the controller is further configured to operate in a generator mode defined by controlling the inverter to always operate below the maximum potential motor speed the inverter can achieve.

11. An electric motor comprising:
a drive circuit including an inverter configured to supply variable frequency current over a first duration and a contactor configured to supply line frequency current over a second duration; and
a controller communicatively coupled to the drive circuit and the electric motor, wherein the controller is configured to:
control the inverter to supply variable frequency current to the electric motor over the first duration, thereby operating the electric motor at a variable motor speed;
dynamically determine, based upon at least one input parameter indicating build up of at least one of pressure or temperature while the electric motor has operated at the variable motor speed, a maximum potential motor speed the inverter can achieve;
determine to operate the electric motor at line frequency current, wherein the electric motor operates at a motor speed corresponding to line frequency when line frequency current is supplied, and wherein the motor speed corresponding to line frequency is greater than the variable motor speed and the maximum potential motor speed is between the variable motor speed and the motor speed corresponding to line frequency; and
as speed of the motor transitions between the variable motor speed and the motor speed corresponding to line frequency, control the drive circuit to transition from supplying variable frequency current to supplying line frequency current before the maximum potential motor speed the inverter can achieve is reached.

12. The electric motor of claim 11, wherein the controller is further configured to determine, based upon at least one input parameter and at least one of a lookup table or a polynomial, the maximum potential motor speed the inverter can achieve, wherein the at least one input parameter includes at least one of a temperature, a pressure, a current, a voltage, or a load.

13. The electric motor of claim 11, wherein the controller is further configured to transmit, to a system controller in communication with the controller, a signal indicating the maximum potential motor speed the inverter can achieve.

14. The electric motor of claim 13, wherein the system controller is configured, in response to receiving the signal indicating the maximum potential motor speed, to:
determine the inverter is operating the electric motor at a speed below the maximum potential motor speed; and
transmit a signal to the controller indicating the drive circuit should be controlled to transition from supplying variable frequency to supplying line frequency.

15. The electric motor of claim 13, wherein the controller is configured to:
receive, from the system controller, a command to transition the drive circuit from supplying variable frequency to supplying line frequency;
determine the variable motor speed is above a speed at which a transition to line frequency can be made;
determine a reduced value of the variable motor speed;
control the inverter to operate the electric motor at the reduced value of the variable motor speed before transitioning the drive circuit from supplying variable frequency current to supplying line frequency current; and
control the drive circuit to transition from supplying variably frequency current to supplying line frequency current.

16. The electric motor of claim 15, wherein the controller is further configured to:
determine an estimated pressure and an estimated load drop at at least one potential variable motor speed; and
determine the reduced value of the variable motor speed, from the at least one potential variable motor speed, based at least in part upon the estimated pressure and estimated load drop.

17. The electric motor of claim 13, wherein the system controller comprises the controller.

18. A method of operating an electric motor, wherein the electric motor is communicatively coupled to a controller and coupled to a drive circuit including an inverter configured to supply variable frequency current over a first duration and a contactor configured to supply line frequency current over a second duration, said method comprising:
controlling the inverter to supply variable frequency current to the electric motor over the first duration, thereby operating the electric motor at a variable motor speed;
dynamically determining, based upon at least one input parameter indicating build up of at least one of pressure or temperature while the electric motor has operated at the variable motor speed, a maximum potential motor speed the inverter can achieve;
receiving a command to operate the electric motor at line frequency current, wherein the electric motor operates at a motor speed corresponding to line frequency when line frequency current is supplied, and wherein the motor speed corresponding to line frequency is greater than the variable motor speed and the maximum potential motor speed is between the variable motor speed and the motor speed corresponding to line frequency; and
as speed of the motor transitions between the variable motor speed and the motor speed corresponding to line frequency, controlling the drive circuit to transition from supplying variable frequency current to supplying line frequency current before the maximum potential motor speed the inverter can achieve is reached.

19. The method of claim 18, further comprising determining, based upon at least one input parameter and at least one of a lookup table or a polynomial, the maximum potential motor speed the inverter can achieve, wherein the at least one input parameter includes at least one of a temperature, a pressure, a current, a voltage, or a load.

20. The method of claim 18, wherein the at least one input parameter comprises at least one of a received input parameter and a measured input parameter.

21. The method of claim 18, further comprising:

transmitting, to a system controller in communication with the controller, a signal indicating the maximum potential motor speed the inverter can achieve;

determining, in response to receiving the maximum potential motor speed, the inverter is operating the electric motor at a speed below the maximum potential motor speed; and transmitting a signal to the controller indicating the drive circuit should be controlled to transition from supplying variable frequency to supplying line frequency.

22. The method of claim 18, further comprising:

receiving, from a system controller in communication with the controller, a command to transition the drive circuit from supplying variable frequency to supplying line frequency;

determining the variable motor speed is above a speed at which a transition to line frequency can be made;

determining a reduced value of the variable motor speed;

controlling the inverter to operate the electric motor at the reduced value of the variable motor speed before transitioning the drive circuit from supplying variable frequency current to supplying line frequency current; and controlling the drive circuit to transition from supplying variably frequency current to supplying line frequency current.

23. The method of claim 22, further comprising:

determining an estimated pressure and an estimated load drop at at least one potential variable motor speed; and determining the reduced value of the variable motor speed, from the at least one potential variable motor speed, based at least in part upon the estimated pressure and estimated load drop.

* * * * *